March 30, 1937. A. L. PARKER 2,075,459
CYLINDRICAL VALVE
Filed July 13, 1936
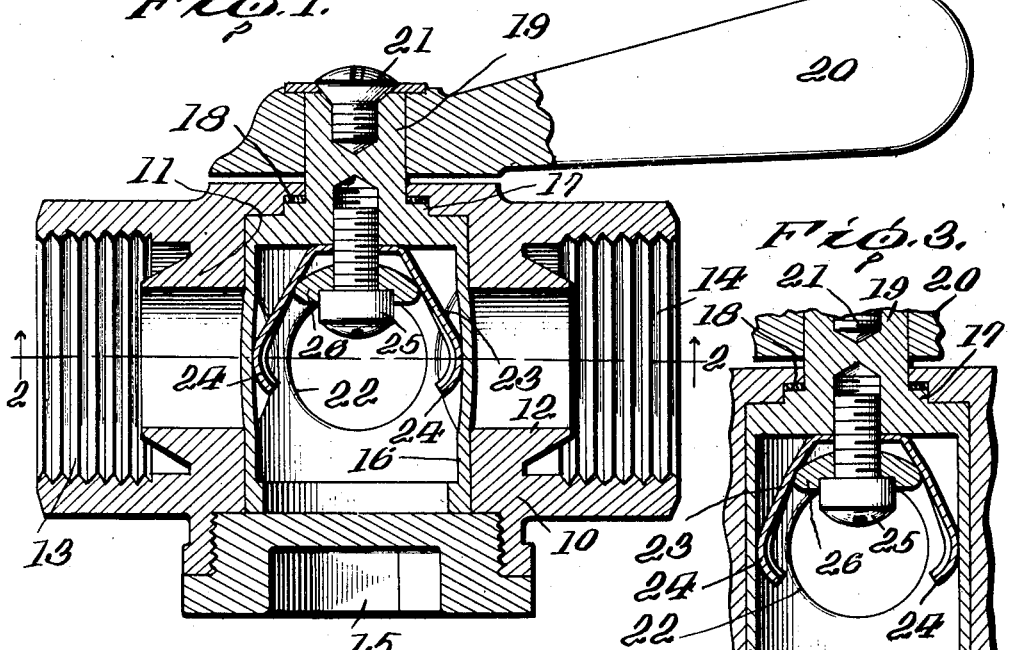
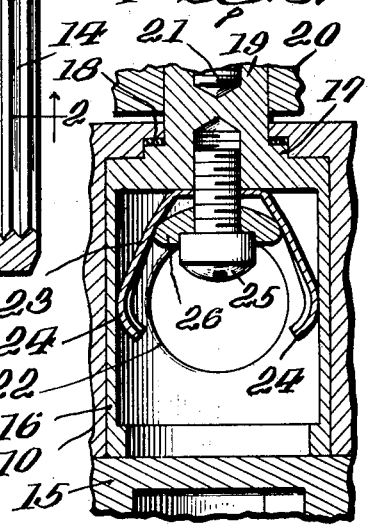
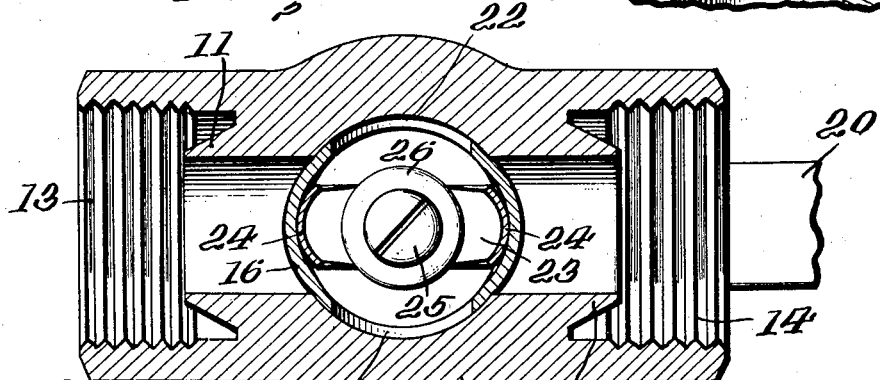
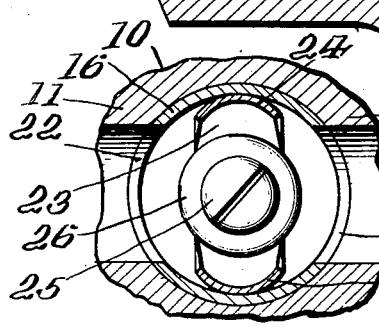
Inventor
Arthur L. Parker
By Mason & Porter
Attorneys Patented Mar. 30, 1937

2,075,459

UNITED STATES PATENT OFFICE 2,075,459

CYLINDRICAL VALVE

Arthur L. Parker, Cleveland, Ohio

Application July 13, 1936, Serial No. 90,420

6 Claims. (Cl. 251—96)

The present invention relates to new and useful improvements in a valve assembly and more particularly to improvements in a rotatable cylindrical valve assembly.

An object of the invention is to provide a valve assembly wherein the wall of a cylindrical valve may be flexed slightly centrally of the ports when the valve is in closed position so as to afford tight sealing contact around the edges of the ports.

A further object of the invention is to provide a valve assembly of the above type wherein spring means carried by the cylindrical valve are adapted to bear against the inner face thereof so as to slightly flex the wall thereof centrally of the ports when the valve is in closed position so as to afford tight sealing contact around the edges of the ports.

The above and other objects of the invention will in part be obvious and will be hereinafter more fully set forth.

In the drawing:

Fig. 1 is a side view in section showing the improved valve assembly with the valve in closed position.

Fig. 2 is a bottom view in section taken along the line 2—2 of Fig. 1.

Fig. 3 is a fragmentary end view in section showing the valve in open position.

Fig. 4 is a vottom view in section of Fig. 3.

The invention relates generally to a valve assembly which includes a rotatable cylindrical valve member for controlling a plurality of ports through the valve casing. The valve member is provided with openings therethrough which, in one position, are adapted to register with the ports in the valve casing and, in another position, to close the ports. The cylindrical wall of the valve member may be flexed slightly. Spring means are carried by the valve member and bear against the inner face thereof between the openings therethrough. When the valve is in closed position, the spring means are adapted to flex the walls of the cylindrical portion of the valve member centrally of the ports so as to afford tight sealing contact around the edges of the ports, which edges serve as valve seats.

Referring more in detail to the accompanying drawing, the body or valve casing 10 is provided with inlet and outlet ports 11, 12 and with internally threaded projecting end portions 13, 14 which are adapted to be connected to suitable conduit means.

A vertical opening through the bottom of the valve casing 10 is closed by a threaded closure member or cap 15. The valve for controlling the inlet and outlet ports 11, 12 is in the form of a cylindrical cup or shell 16, the cylindrical walls of which are relatively thin and may be slightly flexed. The closed or upper end of the cylindrical shell 16 is provided with an offset portion 17 which forms a shoulder on which is disposed a packing washer 18. The closed end of the shell 16 is also provided with a stem portion 19 which extends through an opening in the top of the valve casing 10 and has secured thereto an operating handle 20 by means of a screw 21 or the like. In the illustrated embodiment of the invention, the cylindrical wall portion of the shell 16 is provided with diametrically opposed openings 22. Mounted within the shell 16 is a spring member 23 which is provided with resilient arms 24. The base of the spring member 23 is disposed in contact with the inner face of the closed end of the cylindrical shell 16 and is secured thereto by means of a screw or bolt 25 which passes tnerethrough and which threadedly engages the upper end of the shell 16. The bolt 25 carries an expanding washer 26 which bears against the arms 24 of the spring member 23. By adjusting the bolt 25, the pressure exerted by the expanding washer 26 against the resilient arms 23 can be adjusted so that the force with which the spring arms 24 bear against the wall of the cylindrical portion of the shell 16 can be varied. The spring member 23 is positioned within the shell 16 in such a manner that the resilient arms 24 bear against the wall of the shell 16 in diametrically opposed points, which points are at right angles to the openings 22.

In assembling the valve, the plug 15 is removed, and the cylindrical shell 16 with the spring member 23 properly positioned therein is inserted through the opening in the bottom of the valve casing 10. The plug 15 is then secured to the casing 10 and the handle 20 secured to the stem portion 19 of the valve member. Thus, when it is desired to adjust the tension of the resilient arms 24, the plug 15 may be removed so that access can be had to the bolt 25 for this purpose.

To open the valve, the cylindrical shell 16 is rotated so that the openings 22 therethrough will register with the ports 11, 12 in the valve casing 10, as shown in Fig. 4. To close the valve, the shell is rotated to the position shown in Figs. 1 and 2 of the drawing wherein the wall portion of the shell intermediate the openings 22 therethrough close communication between the inlet and outlet ports 11, 12. In this position, the resilient arms 24 bear against the inner face of the cylindrical wall portion of the valve member centrally of the ports 11, 12 in the casing and exert sufficient pressure on the wall portion of the valve member to slightly flex the same centrally into the ports 11, 12, as shown in Figs. 1 and 2. This will afford a tight sealing contact around the edges of the ports 11, 12.

It is to be clearly understood that minor changes in the details of construction and arrangement of parts may be made without departing from the scope of the invention as set forth in the appended claims.

I claim:

1. A valve assembly comprising a valve casing having a plurality of ports therethrough, a rotatable valve member having a flexible cylindrical wall portion, said wall portion having openings therethrough for affording communication between said ports when the valve is open, and means disposed within said valve member so as to bear against and flex the said wall portion centrally of the ports in said valve casing when the valve is closed whereby to afford tight sealing contact around the edges of the said ports.

2. A valve assembly comprising a valve casing having a plurality of ports therethrough, a rotatable valve member having a flexible cylindrical wall portion, said wall portion having openings therethrough for affording communication between said ports when the valve is open, and spring means disposed within said valve member so as to bear against and flex the said wall portion centrally of the ports in said valve casing when the valve is closed whereby to afford tight sealing contact around the edges of the said ports.

3. A valve assembly comprising a valve casing having a plurality of ports therethrough, a rotatable valve member having a flexible cylindrical wall portion, said wall portion having openings therethrough for affording communication between said ports when the valve is open, a spring member disposed within said valve member and having resilient arms disposed so as to bear against and flex the said wall portion centrally of the ports in said valve casing when the valve is closed whereby to afford tight sealing contact around the edges of the said ports.

4. A valve assembly comprising a valve casing having a plurality of ports therethrough, a rotatable valve member having a flexible cylindrical wall portion, said wall portion having openings therethrough for affording communication between said ports when the valve is open, a spring member disposed within said valve member and having resilient arms disposed so as to bear against and flex the said wall portion centrally of the ports in said valve casing when the valve is closed whereby to afford tight sealing contact around the edges of the said ports, and means engageable with said resilient arms for varying the pressure exerted by the said arms against the said wall portion.

5. A valve assembly comprising a valve casing having a plurality of ports therethrough, a rotatable valve member having a flexible cylindrical wall portion, said wall portion having openings therethrough for affording communication between said ports when the valve is open, a spring member disposed within said valve member and having resilient arms disposed so as to bear against and flex the said wall portion centrally of the ports in said valve casing when the valve is closed whereby to afford tight sealing contact around the edges of the said ports, a bolt for securing said spring member to said valve member, and an expansion member carried by said bolt and engaging the said resilient arms whereby to vary the pressure exerted by the said arms against the said wall portion when said bolt is adjusted.

6. A valve assembly comprising a valve casing having a port therethrough, a movable valve member having a flexible substantially cylindrical wall portion for controlling the passage of fluid through the port in said casing, and means disposed within the substantially cylindrical wall portion of said valve member for bearing radially against the flexible wall portion centrally of the port in said casing to flex the said wall portion centrally into the port in the casing when the valve is closed whereby to afford a tight sealing contact between the edge of the port and the valve member.

ARTHUR L. PARKER.